(12) United States Patent
Huang et al.

(10) Patent No.: US 12,435,898 B2
(45) Date of Patent: Oct. 7, 2025

(54) METHOD FOR STERILIZING AIR CONDITIONER, AIR CONDITIONER AND STORAGE MEDIUM

(71) Applicant: GD MIDEA AIR-CONDITIONING EQUIPMENT CO., LTD., Guangdong (CN)

(72) Inventors: Rupu Huang, Guangdong (CN); Yanpo Shao, Guangdong (CN); Lei Cao, Guangdong (CN)

(73) Assignee: GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 385 days.

(21) Appl. No.: 17/984,672

(22) Filed: Nov. 10, 2022

(65) Prior Publication Data

US 2023/0064842 A1 Mar. 2, 2023

Related U.S. Application Data

(63) Continuation of application No. PCT/CN2021/088746, filed on Apr. 21, 2021.

(30) Foreign Application Priority Data

May 13, 2020 (CN) .......................... 202010406200.2

(51) Int. Cl.
*F24F 11/64* (2018.01)
*F24F 1/0071* (2019.01)
(Continued)

(52) U.S. Cl.
CPC ............ *F24F 11/64* (2018.01); *F24F 1/0071* (2019.02); *F24F 3/16* (2013.01); *F24F 11/67* (2018.01); *F24F 11/83* (2018.01)

(58) Field of Classification Search
CPC .......... F24F 1/0071; F24F 11/64; F24F 11/65; F24F 11/67; F24F 11/83; F24F 2110/12;
(Continued)

(56) References Cited

U.S. PATENT DOCUMENTS

| 2009/0192650 | A1  | 7/2009  | Tonner |                    |
|--------------|-----|---------|--------|--------------------|
| 2014/0291179 | A1* | 10/2014 | Xiang  | B65D 25/00 206/216 |

(Continued)

FOREIGN PATENT DOCUMENTS

| CN | 201028905 Y | 2/2008 |
| CN | 201297796 Y | 8/2009 |

(Continued)

OTHER PUBLICATIONS

International Search Report and Written Opinion dated Jul. 15, 2021 received in International Application No. PCT/CN2021/088746.

(Continued)

*Primary Examiner* — Tameem D Siddiquee
(74) *Attorney, Agent, or Firm* — Scully, Scott, Murphy & Presser, P.C.

(57) ABSTRACT

Disclosed are a method for sterilizing an air conditioner, an air conditioner and a storage medium. The method includes receiving a sterilization instruction, and detecting a temperature of an indoor heat exchanger in a heating mode. When it is determined that the detected temperature of the indoor heat exchanger is lower than a preset sterilization temperature, according to the method, an enhanced vapor injection circulation is started to increase the temperature of the indoor heat exchanger to be higher than the preset sterilization temperature.

9 Claims, 6 Drawing Sheets

(51) Int. Cl.
*F24F 3/16* (2021.01)
*F24F 11/67* (2018.01)
*F24F 11/83* (2018.01)

(58) Field of Classification Search
CPC ......... F24F 2221/22; F24F 3/16; F25B 13/00; Y02A 50/20; Y02B 30/70
See application file for complete search history.

(56) References Cited

U.S. PATENT DOCUMENTS

| | | | |
|---|---|---|---|
| 2017/0254571 A1* | 9/2017 | Xie | F25B 41/39 |
| 2017/0276407 A1* | 9/2017 | Li | F24F 1/10 |
| 2022/0412592 A1* | 12/2022 | Song | F24F 11/65 |
| 2023/0115895 A1* | 4/2023 | Takahashi | A61L 2/208 422/28 |

FOREIGN PATENT DOCUMENTS

| | | | | |
|---|---|---|---|---|
| CN | 101706171 | A | 5/2010 | |
| CN | 101769657 | A | 7/2010 | |
| CN | 102012137 | A | 4/2011 | |
| CN | 102032726 | A | 4/2011 | |
| CN | 102434915 | A | 5/2012 | |
| CN | 102620463 | A | 8/2012 | |
| CN | 103388923 | A | 11/2013 | |
| CN | 203349569 | U | 12/2013 | |
| CN | 103512153 | A | 1/2014 | |
| CN | 203408634 | U | 1/2014 | |
| CN | 104913429 | A | 9/2015 | |
| CN | 105757798 | A | 7/2016 | |
| CN | 105972764 | A | 9/2016 | |
| CN | 106091464 | A | 11/2016 | |
| CN | 106123226 | A | 11/2016 | |
| CN | 106642524 | A | 5/2017 | |
| CN | 109297101 | * | 2/2019 | A61L 9/00 |
| CN | 109297101 | A | 2/2019 | |
| CN | 208765263 | U | 4/2019 | |
| CN | 109945440 | A | 6/2019 | |
| CN | 111043670 | A | 4/2020 | |
| CN | 111121257 | A | 5/2020 | |
| JP | H07310946 | A | 11/1995 | |
| JP | 2002115874 | A | 4/2002 | |
| JP | 2008116167 | A | 5/2008 | |
| JP | 2011185507 | A | 9/2011 | |
| KR | 20040027367 | A | 4/2004 | |

OTHER PUBLICATIONS

First Office Action dated Apr. 2, 2022 received in Chinese Patent Application No. CN 202010406200.2.
Second Office Action dated Aug. 15, 2022 received in Chinese Patent Application No. CN 202010406200.2.
Notification to Grant Patent Right for Invention dated Oct. 10, 2022 received in Chinese Patent Application No. CN 202010406200.2.
Hou, Z. et al., "Study on light commercial frequency-conversion air source heat pump coupled with enhanced vapor injection technique", Refrigeration and Air-Conditioning, Jan. 28, 2018, pp. 21-26.

* cited by examiner

METHOD FOR STERILIZING AIR CONDITIONER, AIR CONDITIONER AND STORAGE MEDIUM

CROSS-REFERENCE TO RELATED APPLICATIONS

This application is a continuation application of PCT International Patent Application No. PCT/CN2021/088746, filed on Apr. 21, 2021, which claims priority to and benefits of Chinese Patent Application No. 202010406200.2, filed on May 13, 2020, the entire contents of which are incorporated herein by reference for all purposes. No new matter has been introduced.

FIELD

The present disclosure relates to the field of air conditioners, and in particular to a method for sterilizing an air conditioner, an air conditioner and a storage medium.

BACKGROUND

At present, some air conditioners already have the sterilization function. The existing method for sterilizing an air conditioner is mainly to increase the temperature of the indoor heat exchanger by controlling the air conditioner to operate in the heating mode, to make the temperature of the indoor heat exchanger reach the sterilization temperature and keep the air conditioner operating for a period of time, thereby realizing a sterilization effect.

However, limited by the energy efficiency ratio and design parameters of the existing air conditioners, the temperature of the indoor heat exchanger can only be raised to the sterilization temperature within a relatively comfortable ambient temperature range. In a harsh environment, the temperature of the indoor heat exchanger cannot reach the sterilization temperature in a heating mode, thereby affecting the sterilization effect.

SUMMARY

The present disclosure provides a method for sterilizing an air conditioner, an air conditioner and a computer-readable storage medium, aiming to solve at least the problems that affect the sterilization effect of the existing air conditioners in the heating mode.

In order to achieve the above objectives, the present disclosure provides a method for sterilizing an air conditioner, includes receiving a sterilization instruction, and detecting a temperature of an indoor heat exchanger in a heating mode, and in response to a detection that the temperature of the indoor heat exchanger is lower than a preset sterilization temperature, starting an enhanced vapor injection (EVI) circulation to increase the temperature of the indoor heat exchanger to be higher than the preset sterilization temperature.

In an embodiment, before the operation of detecting the temperature of the indoor heat exchanger in the heating mode, the method further includes acquiring a preset ambient parameter, and starting the EVI circulation in response to that the preset ambient parameter satisfies a first preset starting condition.

In an embodiment, the preset ambient parameter includes an outdoor ambient temperature, the operation of starting the EVI circulation in response to that the preset ambient parameter satisfies the first preset starting condition includes determining whether the outdoor ambient temperature is lower than a cold temperature threshold, and in response to that the outdoor ambient temperature is lower than the cold temperature threshold, controlling a solenoid valve at an air supply port to open to perform the EVI circulation.

In an embodiment, before the operation of acquiring the preset ambient parameter and starting the EVI circulation in response to that the preset ambient parameter satisfies the first preset starting condition, the method further includes controlling a four-way valve to change over a direction to enter the heating mode according to the sterilization instruction, and controlling a solenoid valve at an air supply port to remain closed.

In an embodiment, the operation of in response to that the temperature of the indoor heat exchanger is lower than the preset sterilization temperature, starting the EVI circulation to increase the temperature of the indoor heat exchanger to be higher than above the preset sterilization temperature includes in response to that the temperature of the indoor heat exchanger is lower than the preset sterilization temperature, acquiring a temperature change rate of the indoor heat exchanger and determining whether the temperature change rate of the indoor heat exchanger is lower than a preset rate, and in response to that the temperature change rate of the indoor heat exchanger is lower than the preset rate, controlling a solenoid valve at an air supply port to open to perform the EVI circulation.

In an embodiment, after the operation of receiving the sterilization instruction, and detecting the temperature of the indoor heat exchanger in the heating mode, the method further includes in response to that the temperature of the indoor heat exchanger is not lower than the preset sterilization temperature, controlling a solenoid valve at an air supply port to close and adjusting a control parameter of the air conditioner to keep the temperature of the indoor heat exchanger stable.

In an embodiment, after the operation of controlling the solenoid valve at the air supply port to close and adjusting the control parameter of the air conditioner to keep the temperature of the indoor heat exchanger stable, the method further includes receiving a sterilization end instruction triggered by users, and stopping adjusting the temperature of the indoor heat exchanger.

In an embodiment, the operation of adjusting the control parameter of the air conditioner to keep the temperature of the indoor heat exchanger stable includes adjusting a fan speed or an operating frequency of a compressor to keep the temperature of the indoor heat exchanger stable.

In order to achieve the above objective, the present disclosure further provides an air conditioner including a memory, a processor and a program for sterilizing an air conditioner stored in the memory and executable on the processor, when the program is executed by the processor, the operations of the method for sterilizing the air conditioner as mentioned above are implemented.

In order to achieve the above objective, the present disclosure further provides a computer-readable storage medium. A program for sterilizing an air conditioner is stored in the computer-readable storage medium, when the program is executed by a processor, the operations of the method for sterilizing the air conditioner as mentioned above are implemented.

The present disclosure provides a method for sterilizing an air conditioner, an air conditioner and a storage medium. The air conditioner can detect the temperature of the indoor heat exchanger in a sterilization mode. When the temperature of the indoor heat exchanger does not reach the preset sterilization temperature, the indoor heat exchanger can be heated by starting the enhanced vapor injection (EVI) circulation. Due to the energy efficiency ratio and other factors to be considered in the design of the air conditioner, the heating power cannot be blindly increased. Therefore, in a relatively cold area, even if the air conditioner operates at full load, the temperature of the indoor heat exchanger cannot be raised to a preset sterilization temperature at which the bacteria can be eliminated, or it takes a significantly long time to raise the temperature of the indoor heat exchanger to the temperature threshold, which is not conducive for users in this area to achieve the sterilization function through the air conditioner. In an embodiment, the temperature of the indoor heat exchanger is detected and the EVI circulation is started, thus the heating speed of the indoor heat exchanger can be increased when the temperature of the indoor heat exchanger is raised relatively slow, thereby realizing a rapid heating of the indoor heat exchanger. In addition, due to the influence of the environment, the temperature of the indoor heat exchanger cannot be raised to the preset sterilization temperature to sterilize. In this case, through the EVI circulation, the temperature of the indoor heat exchanger can break through the limit from the environment, and be raised to the sterilization temperature, to effectively raise the temperature of the indoor heat exchanger.

The realization of the objective, functional characteristics, and advantages of the present disclosure are further described with reference to the accompanying drawings.

DETAILED DESCRIPTION OF EMBODIMENTS

It should be understood that the exemplary embodiments described herein are only used to explain the present disclosure, and are not intended to limit the present disclosure.

Figure 1:
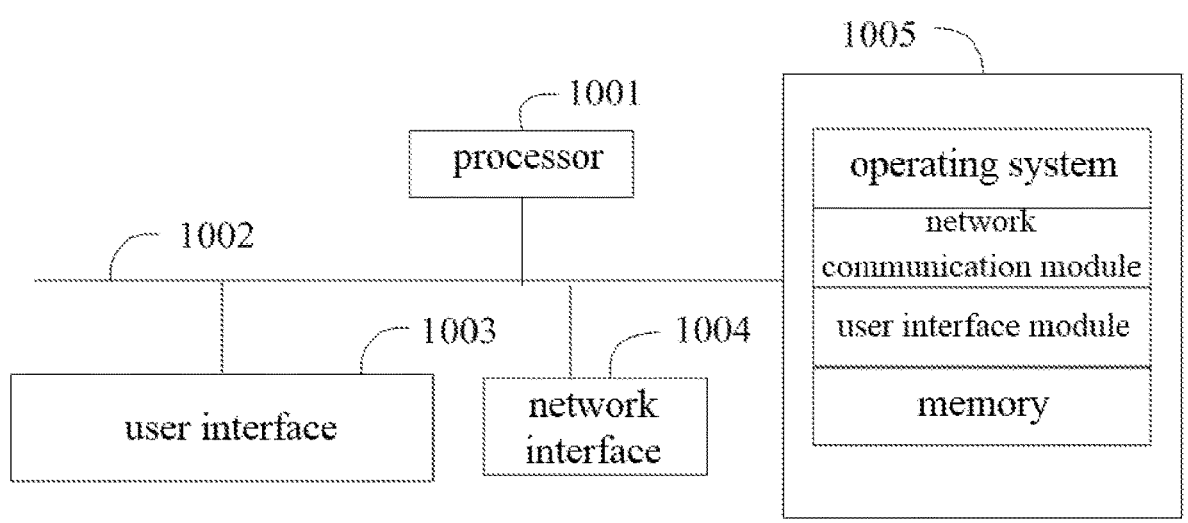
FIG. 1 is a schematic structure diagram of a device in a hardware operating environment according to an embodiment of the present disclosure.

As shown in FIG. 1, FIG. 1 is a schematic structure diagram of a device in a hardware operating environment according to an embodiment of the present disclosure.

In an embodiment of the present disclosure, the terminal can be an air conditioner, and the air conditioner may include an indoor heat exchanger, an outdoor heat exchanger and an enhanced vapor injection (EVI) compressor. The outdoor heat exchanger is provided with an outdoor temperature detector, and the indoor heat exchanger is provided with an indoor temperature detector. The indoor heat exchanger, the outdoor heat exchanger and the EVI compressor are connected to each other through a four-way valve. Another end of the outdoor heat exchanger is connected to an air supply port of the EVI compressor through a first throttle component and a flash tank in turn. Another end of the indoor heat exchanger is connected to the air supply port of the EVI compressor through a second throttle component and a flash tank in turn. A solenoid valve, which can control the air supply port of the EVI compressor to open or close, is provided between the flash tank and the EVI compressor.

As shown in FIG. 1, the terminal may include a processor 1001, such as a CPU, a communication bus 1002, a user interface 1003, a network interface 1004, and a memory 1005. The communication bus 1002 is configured to implement communication between the components. The user interface 1003 may include a display, and an input unit such as a keyboard. The user interface 1003 may also include a standard wired interface and a wireless interface. The network interface 1004 can further include a standard wired interface and a wireless interface (such as a WI-FI interface). The memory 1005 can be a high-speed random access memory (RAM) or a non-volatile memory, such as a magnetic disk memory. The memory 1005 can also be a storage device independent of the foregoing processor 1001.

In an embodiment, the terminal can further include a camera, a Radio Frequency (RF) circuit, a sensor, an audio circuit, a WiFi module, and the like. Of course, the hardware device can also be configured with other sensors such as a gyroscope, a barometer, a hygrometer, a thermometer, and an infrared sensor, which will not be repeated here.

Those skilled in the art should understand that the terminal structure shown in FIG. 1 does not constitute a limitation on the terminal, and can include more or fewer components, a combination of some components, or differently arranged components than shown in the figure.

As shown in FIG. 1, the memory 1005 as a computer storage medium may include an operating system, a network communication module, a user interface module, and a program for sterilizing an air conditioner.

In the terminal shown in FIG. 1, the network interface 1004 is mainly configured to connect to a background server and perform data communication with the background server. The user interface 1003 is mainly configured to connect to a client (user) and perform data communication with the client. The processor 1001 can be configured to call the program for sterilizing an air conditioner stored in memory 1005, and perform the following operations:

receiving a sterilization instruction, detecting a temperature of an indoor heat exchanger in a heating mode, and determining whether the temperature of the indoor heat exchanger is lower than a preset sterilization temperature; and in response to a determination that the temperature of the indoor heat exchanger is lower than the preset sterilization temperature, starting an EVI circulation to increase the temperature of the indoor heat exchanger to be higher than the preset sterilization temperature.

Further, the processor 1001 can call the program for sterilizing the air conditioner stored in the memory 1005, and perform the following operations:

acquiring a preset ambient parameter, and determining whether the preset ambient parameter satisfies a first preset starting condition; and starting the EVI circulation in response to a determination that the preset ambient parameter satisfies the first preset starting condition.

Further, the processor 1001 can call the program for sterilizing the air conditioner stored in the memory 1005, and perform the following operations:
  determining whether the outdoor ambient temperature is lower than a cold temperature threshold; and
  in response to that the outdoor ambient temperature is lower than the cold temperature threshold, controlling a solenoid valve at an air supply port to open to perform the EVI circulation.

Further, the processor 1001 can call the program for sterilizing the air conditioner stored in the memory 1005, and perform the following operations:
  controlling a four-way valve to change over a direction to enter the heating mode according to the sterilization instruction, and controlling a solenoid valve at an air supply port to remain closed.

Further, the processor 1001 can call the program for sterilizing the air conditioner stored in the memory 1005, and perform the following operations:
  in response to that the temperature of the indoor heat exchanger is lower than the preset sterilization temperature, acquiring a temperature change rate of the indoor heat exchanger and determining whether the temperature change rate of the indoor heat exchanger is lower than a preset rate; and
  in response to that the temperature change rate of the indoor heat exchanger is lower than the preset rate, controlling a solenoid valve at an air supply port to open to perform the EVI circulation.

Further, the processor 1001 can call the program for sterilizing the air conditioner stored in the memory 1005, and perform the following operations:
  In response to that the temperature of the indoor heat exchanger is not lower than the preset sterilization temperature, controlling a solenoid valve at an air supply port to close, and adjusting a control parameter of the air conditioner to keep the temperature of the indoor heat exchanger stable.

Further, the processor 1001 can call the program for sterilizing the air conditioner stored in the memory 1005, and perform the following operations:
  receiving a sterilization end instruction triggered by users; and
  stopping adjusting the temperature of the indoor heat exchanger.

Further, the processor 1001 can call the program for sterilizing the air conditioner stored in the memory 1005, and perform the following operations:
  adjusting a fan speed or a compressor operating frequency to keep the temperature of the indoor heat exchanger stable.

The exemplary embodiments of the air conditioner of the present disclosure are basically the same as the following embodiments of the method for sterilizing the air conditioner, which will not be repeated here.

Figure 2:
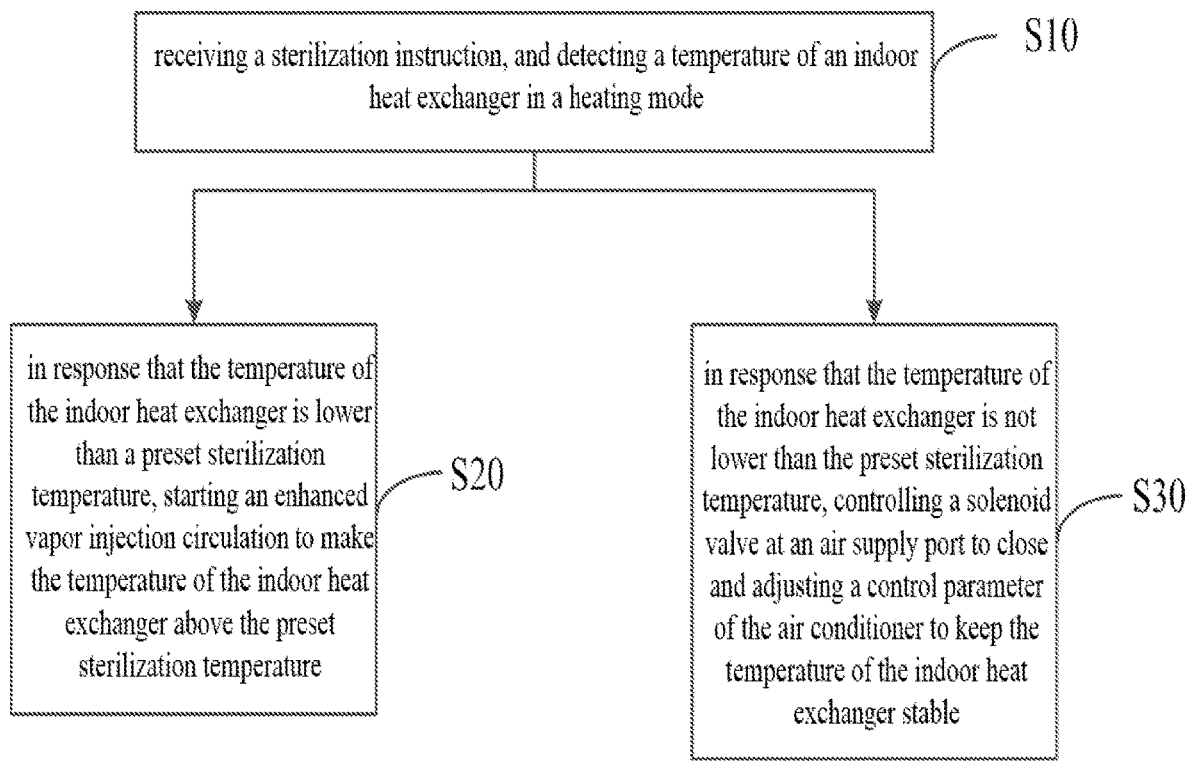
FIG. 2 is a schematic flowchart of a method for sterilizing an air conditioner according to a first embodiment and a fifth embodiment of the present disclosure.

As shown in FIG. 2, FIG. 2 is a schematic flowchart of a method for sterilizing an air conditioner according to a first embodiment of the present disclosure.

The method for sterilizing an air conditioner includes the following operations:

Operation S10, receiving a sterilization instruction, and detecting a temperature of an indoor heat exchanger in a heating mode.

The existing air conditioner usually includes an indoor component and an outdoor component, and a cooling effect or a heating effect is achieved through a heat exchange between the indoor heat exchanger and the outdoor heat exchanger. In the heating mode, the temperature of the indoor heat exchanger will continue to rise. Based on a large amount of experimental data, it can be determined that during the air conditioner continues to operate for a period of time when the temperature of the indoor heat exchanger of the air conditioner is not lower than 56° C., an indoor sterilization effect at high temperature can be achieved. The air conditioner can receive a sterilization instruction triggered by the user and enter the heating mode to operate according to the sterilization instruction. When operating in the heating mode, the air conditioner raises the temperature of the indoor heat exchanger through the heat exchange between the indoor heat exchanger and the outdoor heat exchanger. Therefore, the temperature of the indoor heat exchanger can be detected at every preset period to determine whether the temperature of the indoor heat exchanger reaches the sterilization temperature to achieve the sterilization effect.

Operation S20, in response to that the temperature of the indoor heat exchanger is lower than a preset sterilization temperature, starting an EVI circulation to increase the temperature of the indoor heat exchanger to be higher than the preset sterilization temperature.

A preset sterilization temperature preset in the air conditioner is the sterilization temperature, at which the air conditioner can achieve the sterilization effect. After being detected, the temperature of the indoor heat exchanger can be compared with the preset sterilization temperature. When the temperature of the indoor heat exchanger is lower than the preset sterilization temperature, the air conditioner can control a solenoid valve between a flash tank and an air supply port of the EVI compressor to open to supply gas to the EVI compressor. The sucked gas and the refrigerant in the compressor are mixed and compressed to increase the refrigerant flow in the condenser. In this case, an enthalpy difference of the main circulation loop is increased, and an operating efficiency of the compressor is greatly improved. That is, the heating speed of the indoor heat exchanger is increased, thereby quickly raising the temperature of the indoor heat exchanger to the preset sterilization temperature and resulting in a sterilization effect. The preset sterilization temperature can be set to 56° C.

In the present disclosure, the air conditioner can detect the temperature of the indoor heat exchanger in the sterilization mode. When the temperature does not reach the preset sterilization temperature, the temperature of the indoor heat exchanger can be raised by starting the EVI circulation. Due to the energy efficiency ratio and other factors to be considered in the design of the air conditioner, the heating power cannot be blindly increased. Therefore, in a relatively cold area, even if the air conditioner operates at full load, the temperature of the indoor heat exchanger cannot be raised to a preset sterilization temperature at which the bacteria can be eliminated, or it takes a significantly long time to raise the temperature of the indoor heat exchanger to the temperature threshold, which is not conducive for users in this area to achieve the sterilization function through the air conditioner. In an embodiment, the temperature of the indoor heat exchanger is detected and the EVI circulation is started, thus the heating speed of the indoor heat exchanger can be increased when the temperature of the indoor heat exchanger is raised relatively slow, thereby realizing a rapid heating of the indoor heat exchanger. In addition, due to the influence of the environment, the temperature of the indoor heat exchanger cannot be raised to the preset sterilization temperature to sterilize. In this case, through the EVI circulation, the temperature of the indoor heat exchanger can break through the limit from the environment, and be raised to the sterilization temperature, to effectively raise the temperature of the indoor heat exchanger.

Figure 3:
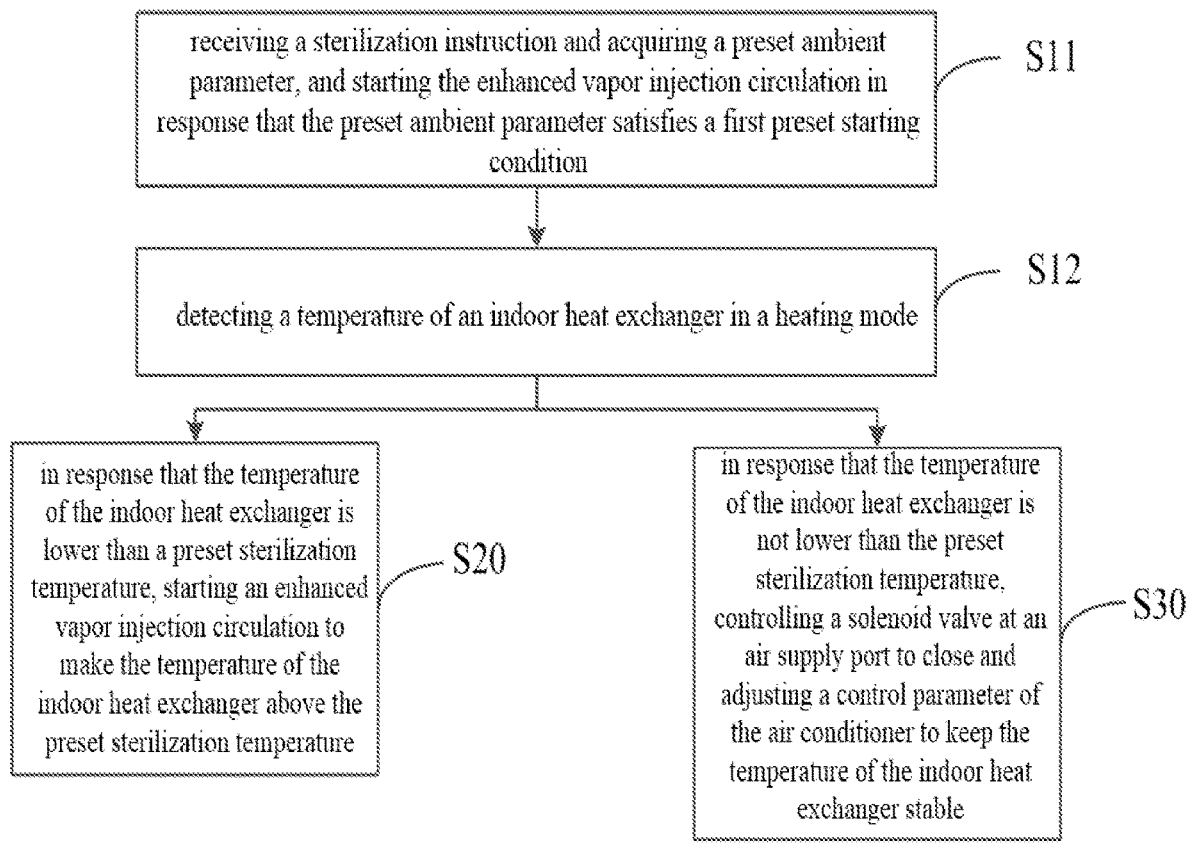
FIG. 3 is a schematic flowchart of the method for sterilizing an air conditioner according to a second embodiment of the present disclosure.

Further, as shown in FIG. 3, FIG. 3 is a schematic flowchart of the method for sterilizing an air conditioner according to a second embodiment of the present disclosure. Based on the above-mentioned embodiment shown in FIG. 2, the operation S10 of receiving a sterilization instruction, and detecting a temperature of an indoor heat exchanger in a heating mode further includes:

Operation S11, receiving a sterilization instruction and acquiring a preset ambient parameter, and starting the EVI circulation in response to that the preset ambient parameter satisfies a first preset starting condition.

Operation S12, detecting a temperature of an indoor heat exchanger in a heating mode.

In an embodiment, after receiving the sterilization instruction triggered by the user, the air conditioner can acquire the preset outdoor environmental parameters and determine whether the preset environmental parameters satisfy the first preset starting condition. When the first preset starting condition is satisfied, the air conditioner can be directly controlled to start EVI circulation and detect the temperature of the indoor heat exchanger, to determine whether to keep the temperature of the indoor heat exchanger stable according to whether the temperature of the indoor heat exchanger reaches the preset sterilization temperature. It can be understood that when the outdoor environment is relatively extreme, the air conditioner can directly start the EVI circulation without detecting the temperature of the indoor heat exchanger, to improve the heat exchange efficiency and increase the heating speed of the indoor heat exchanger through the EVI circulation when the outdoor environment is relatively cold and the surface of the outdoor heat exchanger is prone to frost.

Figure 4:
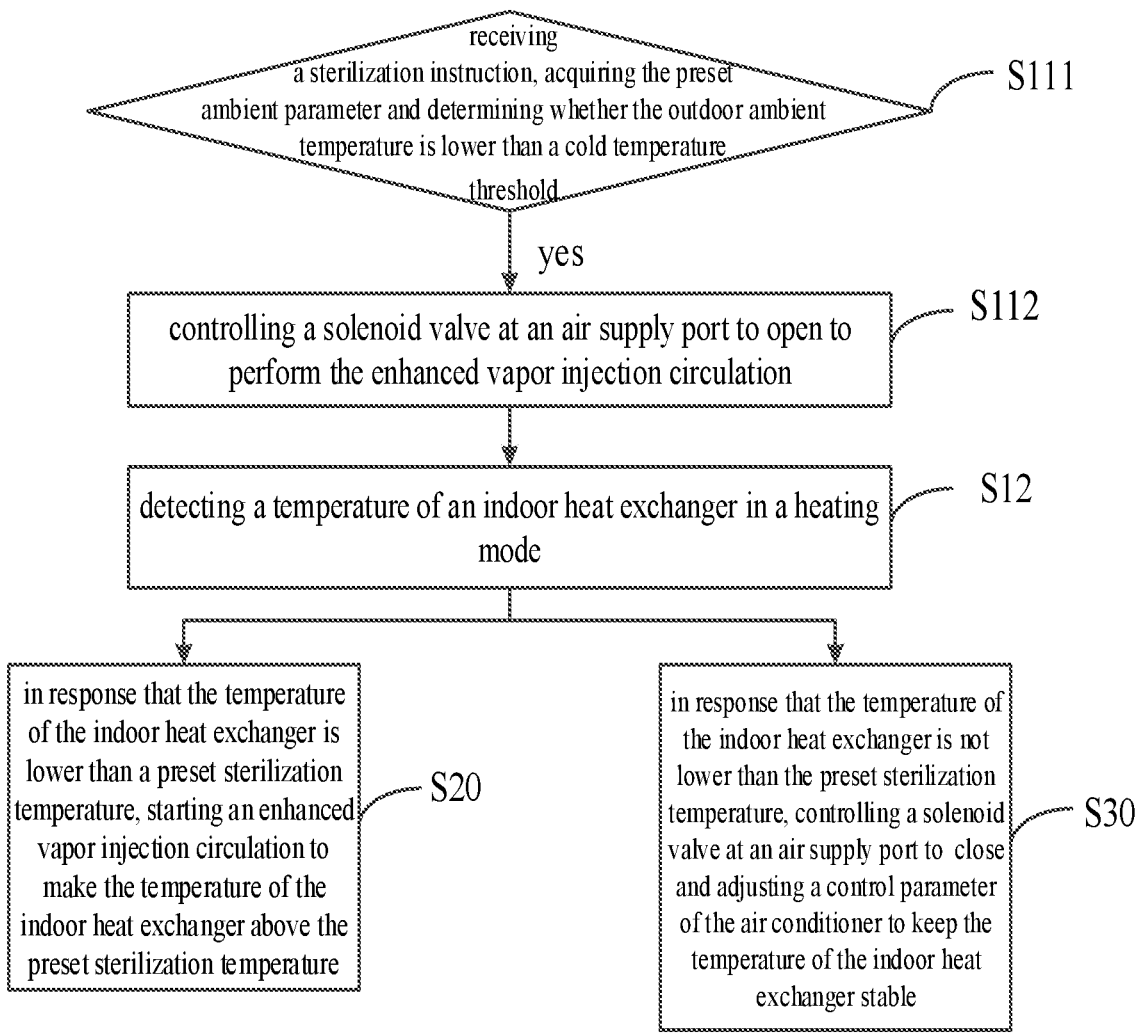
FIG. 4 is a schematic flowchart of the method for sterilizing an air conditioner according to a third embodiment of the present disclosure.

Further, as shown in FIG. 4, FIG. 4 is a schematic flowchart of the method for sterilizing an air conditioner according to a third embodiment of the present disclosure. Based on the above-mentioned embodiment shown in FIG. 3, the preset ambient parameter includes an outdoor ambient temperature, and the operation S11 of receiving a sterilization instruction and acquiring a preset ambient parameter, and starting the EVI circulation in response to that the preset ambient parameter satisfies a first preset starting condition further includes:

S111, receiving a sterilization instruction, acquiring the preset ambient parameter and determining whether the outdoor ambient temperature is lower than a cold temperature threshold.

S112, in response to that the outdoor ambient temperature is lower than the cold temperature threshold, controlling a solenoid valve at an air supply port to open to perform the EVI circulation.

In an embodiment, the air conditioner may acquire the outdoor ambient temperature through an outdoor temperature detector provided on the outdoor heat exchanger to determine whether to start the EVI circulation in advance. When the outdoor ambient temperature is acquired, the air conditioner can compare the outdoor ambient temperature with the preset cold temperature threshold. When the outdoor ambient temperature is lower than or equal to the cold temperature threshold, it means that the current environment is relatively cold, and the indoor heat exchanger of the air conditioner may not be heated to the preset sterilization temperature or the heating speed of the indoor heat exchanger of the air conditioner may be overly low. In this case, the air conditioner can control the solenoid valve at the air supply port of the EVI compressor to open to perform the EVI circulation. Thus the heating efficiency of the air conditioner is increased, and the air conditioner that cannot be heated to the preset sterilization temperature can be successfully heated to the sterilization temperature, or the heating speed of the indoor heat exchanger can be increased to heat up quickly. When detecting that the outdoor ambient temperature is higher than the cold temperature threshold, the air conditioner further determines whether to start the EVI circulation by detecting the temperature of the indoor heat exchanger.

It can be understood that the cold temperature threshold can be −10° C., that is, when detecting that the outdoor ambient temperature is lower than −10° C., the air conditioner may directly control the solenoid valve at the air supply port to open to perform the EVI circulation.

Further, in an embodiment of the method for sterilizing the air conditioner, before the operation S11 of receiving a sterilization instruction and acquiring a preset ambient parameter, and starting the EVI circulation in response to that the preset ambient parameter satisfies a first preset starting condition, the method further includes:

controlling a four-way valve to change over a direction to enter the heating mode according to the sterilization instruction, and controlling a solenoid valve at an air supply port to remain closed.

In an embodiment, after receiving the sterilization instruction triggered by the user, the air conditioner needs to enter the heating mode to heat the indoor heat exchanger. By controlling the four-way valve to change over a direction, the air conditioner can not only make the air conditioner mode switched from other modes to the heating mode and close the solenoid valve at the air supply of the air conditioner to end the EVI circulation, but also start the EVI circulation when a starting condition of the EVI circulation is satisfied to increase the heating efficiency of the indoor heat exchanger.

Figure 5:
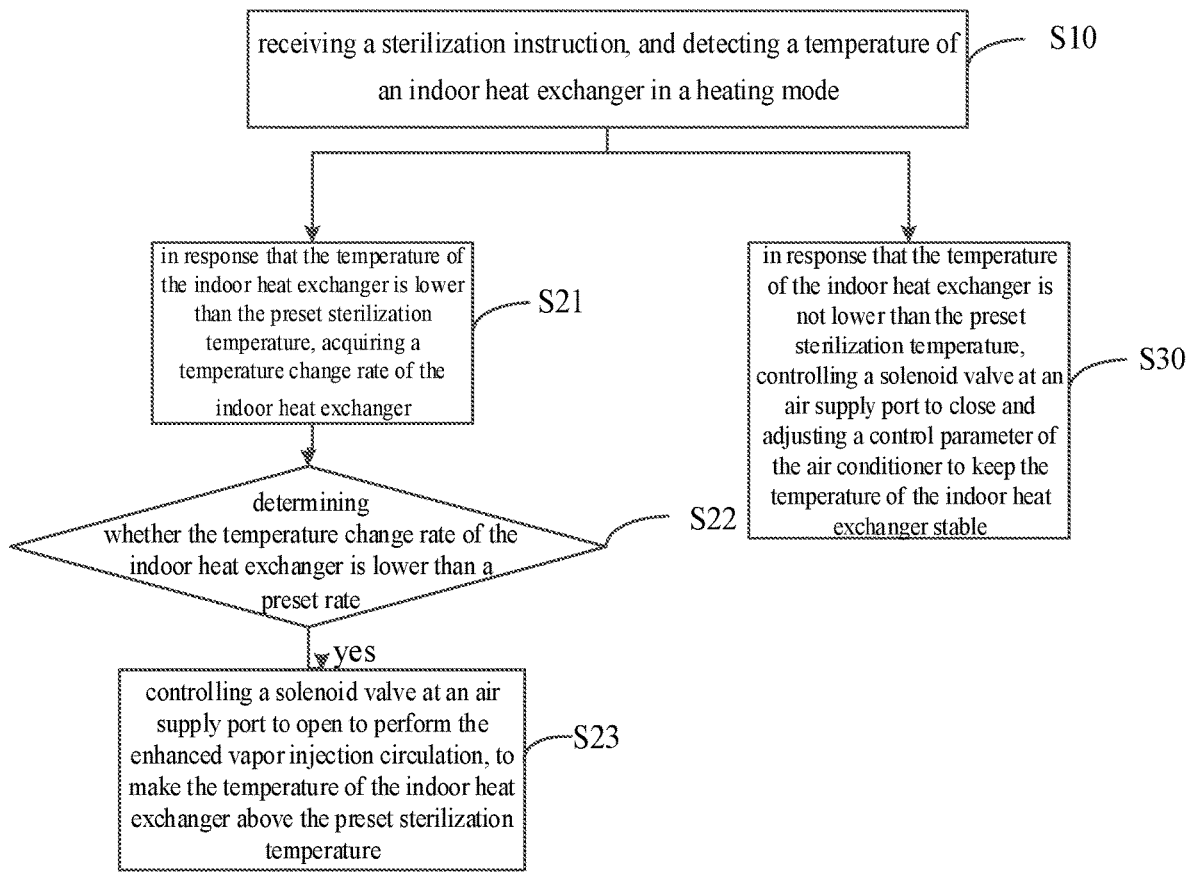
FIG. 5 is a schematic flowchart of the method for sterilizing an air conditioner according to a fourth embodiment of the present disclosure.

Further, as shown in FIG. 5, FIG. 5 is a schematic flowchart of the method for sterilizing an air conditioner according to a fourth embodiment of the present disclosure. Based on the above-mentioned embodiment shown in FIG. 2, the operation S20 of in response to that the temperature of the indoor heat exchanger is lower than a preset sterilization temperature, starting an EVI circulation to increase the temperature of the indoor heat exchanger to be higher than the preset sterilization temperature further includes:

Operation S21, in response to that the temperature of the indoor heat exchanger is lower than the preset sterilization temperature, acquiring a temperature change rate of the indoor heat exchanger.

Operation S22, determining whether the temperature change rate of the indoor heat exchanger is lower than a preset rate.

Operation S23, in response to that the temperature change rate of the indoor heat exchanger is lower than the preset rate, controlling a solenoid valve at an air supply port to open to perform the EVI circulation, to increase the temperature of the indoor heat exchanger to be higher than the preset sterilization temperature.

In an embodiment, during heating the indoor heat exchanger through the heat exchange between the indoor heat exchanger and the outdoor heat exchanger, due to the ambient temperature in some areas is relatively suitable, the air conditioner can quickly raise the temperature of the indoor heat exchanger to the preset sterilization temperature without starting the EVI circulation, to achieve the sterilization effect. In this case, if the EVI circulation is directly started, not only the heating speed cannot be effectively improved, but the power consumption of the air conditioner can be increased, and the service life of the EVI compressor can be shortened. Therefore, when detecting that the temperature of the indoor heat exchanger is lower than the preset sterilization temperature, the air conditioner can further detect the temperature change rate of the indoor heat exchanger. The temperature change rate of the indoor heat exchanger refers to the heating rate of the indoor heat exchanger. After the heating rate of the indoor heat exchanger and the preset rate are compared, if the heating rate of the indoor heat exchanger is higher than the preset rate, it means that without starting the EVI circulation, the temperature of the indoor heat exchanger can be quickly raised to the preset sterilization temperature by the air conditioner in the normal heating mode. In this case, it is not necessary to start the EVI circulation. If the heating rate of the indoor heat exchanger does not reach the preset rate, it means that it takes a lot of time for the air conditioner to raise the temperature of the indoor heat exchanger to the preset sterilization temperature. In this case, it is necessary to control the solenoid valve at the air supply port to open to perform the EVI circulation and improve the heating rate of the indoor heat exchanger, thereby raising the temperature of the indoor heat exchanger to the preset sterilization temperature as soon as possible to sterilize the air conditioner.

It should be noted that the above-mentioned temperature change rate can be 1° C./min, that is, when the heating rate of the indoor heat exchanger of the air conditioner is lower than 1° C./min, the heating rate can be determined as relatively slow, and the EVI circulation is started to increase the temperature heating rate.

Further, as shown in FIG. 2, FIG. 2 is a schematic flowchart of a method for sterilizing an air conditioner according to a fifth embodiment of the present disclosure. Based on the above-mentioned embodiments shown in FIG. 2 to FIG. 5, after the operation S10 of receiving a sterilization instruction, and detecting a temperature of an indoor heat exchanger in a heating mode, the method further includes:

Operation S30, in response to that the temperature of the indoor heat exchanger is not lower than the preset sterilization temperature, controlling a solenoid valve at an air supply port to close and adjusting a control parameter of the air conditioner to keep the temperature of the indoor heat exchanger stable.

In an embodiment, when the air conditioner detects that the temperature of the indoor heat exchanger is not lower than the preset sterilization temperature, it means that the air conditioner has an indoor sterilization effect. In this case, continuing to raise the temperature of the indoor heat exchanger will increase the energy consumption of the air conditioner, thereby wasting electric energy. Therefore, when the temperature of the indoor heat exchanger reaches the preset sterilization temperature, the air conditioner not only can adjust various control parameters of the air conditioner to keep the temperature of the indoor heat exchanger stable on the premise that the temperature of the indoor heat exchanger is not lower than the preset sterilization temperature, but also can close the solenoid valve at the air supply port to end the EVI circulation. Through adjusting the heat exchange power, the fan speed or the compressor frequency, the air conditioner can control the temperature of the indoor heat exchanger, to ensure that the air conditioner operates continuously under a condition that the temperature of the indoor heat exchanger is not lower than the preset sterilization temperature.

Further, in the fifth embodiment of the method for sterilizing the air conditioner in the present disclosure, after the operation S30 of in response to that the temperature of the indoor heat exchanger is not lower than the preset sterilization temperature, controlling a solenoid valve at an air supply port to close and adjusting a control parameter of the air conditioner to keep the temperature of the indoor heat exchanger stable, the method further includes receiving a sterilization end instruction triggered by users and stopping adjusting the temperature of the indoor heat exchanger.

In an embodiment, after receiving a sterilization end instruction triggered by users, the air conditioner can no longer adjust the temperature of the indoor heat exchanger, and operates in a normal heating mode or returns to an operating mode which is before receiving the sterilization instruction.

Figure 6:
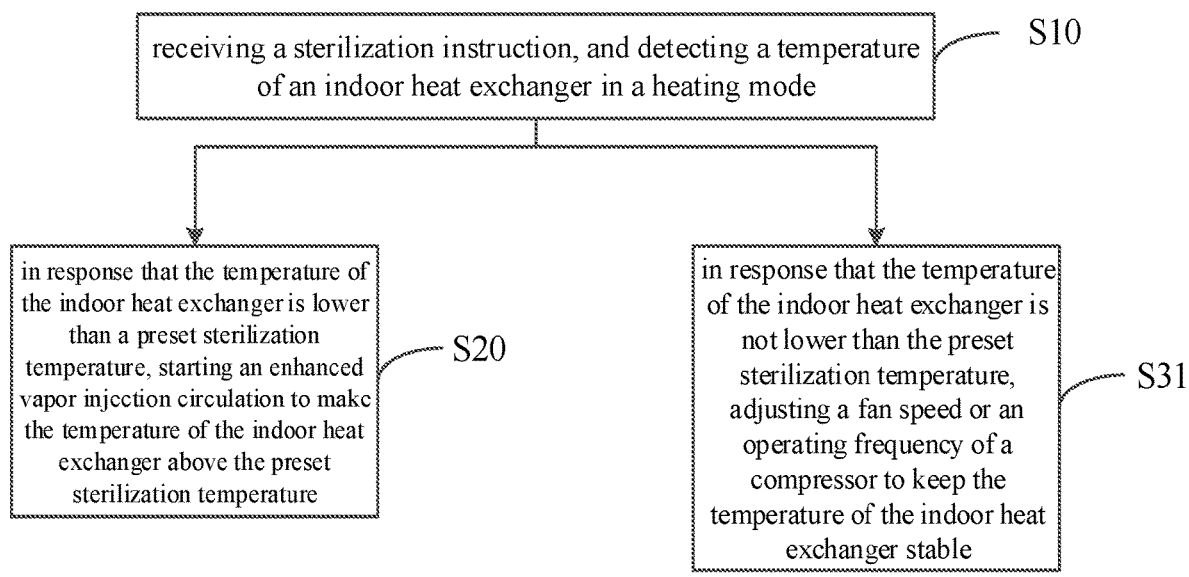
FIG. 6 is a schematic flowchart of the method for sterilizing an air conditioner according to a sixth embodiment of the present disclosure.

Further, as shown in FIG. 6, FIG. 6 is a schematic flowchart of the method for sterilizing an air conditioner according to a sixth embodiment of the present disclosure. Based on the above-mentioned embodiment shown in FIG. 2, the operation S30 of in response to that the temperature of the indoor heat exchanger is not lower than the preset sterilization temperature, controlling a solenoid valve at an air supply port to close and adjusting a control parameter of the air conditioner to keep the temperature of the indoor heat exchanger stable further includes:

Operation S31, in response to that the temperature of the indoor heat exchanger is not lower than the preset sterilization temperature, controlling a solenoid valve at an air supply port to close and adjusting a fan speed or an operating frequency of a compressor to keep the temperature of the indoor heat exchanger stable.

In an embodiment, the air conditioner can keep the temperature of the indoor heat exchanger stable by controlling various control parameters. For example, the air conditioner can keep the temperature of the indoor heat exchanger above the preset sterilization temperature by adjusting a fan speed of the indoor component, a fan speed of the outdoor component or an operating frequency of a compressor. When the fan speed of the indoor component is increased, the temperature of the indoor heat exchanger can be reduced, and vice versa, the temperature of the indoor heat exchanger can be increased. When the operating frequency of the compressor is increased, the heating efficiency of the air conditioner can be improved, and the temperature of the indoor heat exchanger can be increased, and vice versa, the temperature of the indoor heat exchanger can be reduced. By adjusting various control parameters, the air conditioner can operate when the temperature of the indoor heat exchanger is above the preset sterilization temperature to achieve a sterilization effect.

It should be noted that, when adjusting various control parameters, different control parameters may be adjusted according to the preset priority. For example, when the temperature of the indoor heat exchanger needs to be increased, the indoor fan speed can be reduced first. Then when the indoor fan speed is reduced to the minimum wind speed, the operating frequency of the compressor can be increased to heat the indoor heat exchanger. The priority order for adjusting various control parameters is not limited here.

In addition, the present disclosure further provides a computer-readable storage medium, and a program for sterilizing an air conditioner is stored in the computer-readable storage medium. The computer-readable storage medium may be the memory 20 of the terminal shown in FIG. 1, or may be at least one of a Read-Only memory (ROM), a Random Access memory (RAM), a magnetic disk, and an optical disk. The computer-readable storage medium includes several instructions to cause an air conditioner with a processor to execute the method described in each embodiment of the present disclosure.

It should be understood that, in the description of the present disclosure, the description of the description of reference terms such as "an embodiment", "another embodiment", "other embodiment", or "first embodiment~Nth embodiment", and the like, means that particular features, structures, materials or characteristics in the embodiment or the example are combined and included in at least one embodiment or example of the present disclosure. In this specification, schematic descriptions of the above terms do not necessarily refer to the same embodiment or example. Furthermore, the specific features, structures, materials or characteristics described above may be combined in any one or more embodiments or examples by means of any suitable manner.

It should be noted that, herein, the terms "include", "including" or any other variations thereof are intended to encompass non-exclusive inclusions, so that a process, method, article or system literally including a series of elements includes not only those elements, but also other elements not expressly listed or inherent to such a process, method, article or system. Without further limitation, an element qualified by the phrase "including a . . . " does not preclude the existence of additional identical elements in the process, method, article or system that includes the element.

The above-mentioned serial numbers of the embodiments of the present disclosure are only for description, and do not represent the advantages or disadvantages of the embodiments.

From the description of the above embodiments, those skilled in the art can clearly understand that the methods of the above embodiments can be implemented not only by means of a software plus a necessary general hardware platform, but also by means of a hardware. However in many cases the former is better. Based on this understanding, the technical solutions of the present disclosure in essence or the parts that make contributions to the prior art can be embodied in the form of software products. The computer software products is stored in a storage medium (such as a read-only memory 1005/random access memory 1005, a magnetic disk or an optical disk, etc.) as mentioned above, and includes several instructions to make a terminal device (such as a mobile phone, a computer, a server, an air conditioner, or a network device, etc.) execute the methods described in the various embodiments of the present disclosure.

The above are only some embodiments of the present disclosure, and do not limit the scope of the present disclosure thereto. Any equivalent structure transformation or any equivalent process transformation made according to the description and drawings of the present disclosure, or direct/indirect application in other related technical fields are included in the scope of the present disclosure.

What is claimed is:

1. A method for sterilizing an air conditioner, comprising:
receiving a sterilization instruction;
acquiring an outdoor ambient temperature;
determining whether the outdoor ambient temperature is lower than a cold temperature threshold; and
in response to determining that the outdoor ambient temperature is lower than the cold temperature threshold:
detecting a temperature of an indoor heat exchanger in a heating mode;
determining whether the temperature of the indoor heat exchanger is lower than a preset sterilization temperature; and
in response to determining that the temperature of the indoor heat exchanger is lower than the preset sterilization temperature, starting an enhanced vapor injection (EVI) circulation to increase the temperature of the indoor heat exchanger to be higher than the preset sterilization temperature.

2. The method of claim 1, wherein the starting the EVI circulation to increase the temperature of the indoor heat exchanger to be higher than the preset sterilization temperature comprises controlling a solenoid valve at an air supply port to open to perform the EVI circulation.

3. The method of claim 1, wherein before the acquiring the outdoor ambient temperature, the method further comprises:
controlling a four-way valve to change over a direction to enter the heating mode according to the sterilization instruction, and
controlling a solenoid valve at an air supply port to remain closed.

4. The method of claim 1, wherein the starting the EVI circulation to increase the temperature of the indoor heat exchanger to be higher than the preset sterilization temperature comprises:
in response to determining that the temperature of the indoor heat exchanger is lower than the preset sterilization temperature, acquiring a temperature change rate of the indoor heat exchanger and determining whether the temperature change rate of the indoor heat exchanger is lower than a preset rate; and
in response to determining that the temperature change rate of the indoor heat exchanger is lower than the preset rate, controlling a solenoid valve at an air supply port to open to perform the EVI circulation.

5. The method of claim 1, wherein after the receiving the sterilization instruction and the detecting the temperature of the indoor heat exchanger in the heating mode, the method further comprises:
in response to determining that the temperature of the indoor heat exchanger is not lower than the preset sterilization temperature, controlling a solenoid valve at an air supply port to close and adjusting a control parameter of the air conditioner to stabilize the temperature of the indoor heat exchanger.

6. The method of claim 5, wherein after the controlling the solenoid valve at the air supply port to close and adjusting the control parameter of the air conditioner to stabilize the temperature of the indoor heat exchanger, the method further comprises:
receiving a sterilization end instruction triggered by a user; and
stopping adjusting the temperature of the indoor heat exchanger.

7. The method of claim 5, wherein the adjusting the control parameter of the air conditioner to stabilize the temperature of the indoor heat exchanger comprises:
adjusting at least one of a fan speed or an operating frequency of a compressor to stabilize the temperature of the indoor heat exchanger.

8. An air conditioner comprising:
a memory,
a processor, and
a program for sterilizing an air conditioner stored in the memory and executable by the processor,
wherein when the program is executed by the processor, the method of claim 1 is implemented for sterilizing the air conditioner.

9. A computer-readable storage medium, wherein a program for sterilizing an air conditioner is stored in the computer-readable storage medium, when the program is executed by a processor, the method of claim 1 is implemented for sterilizing the air conditioner.

* * * * *